Feb. 21, 1961     W. MAHLFELDT     2,972,688
UNBALANCED ROTOR DYNAMOELECTRIC MACHINE
Filed Dec. 21, 1956
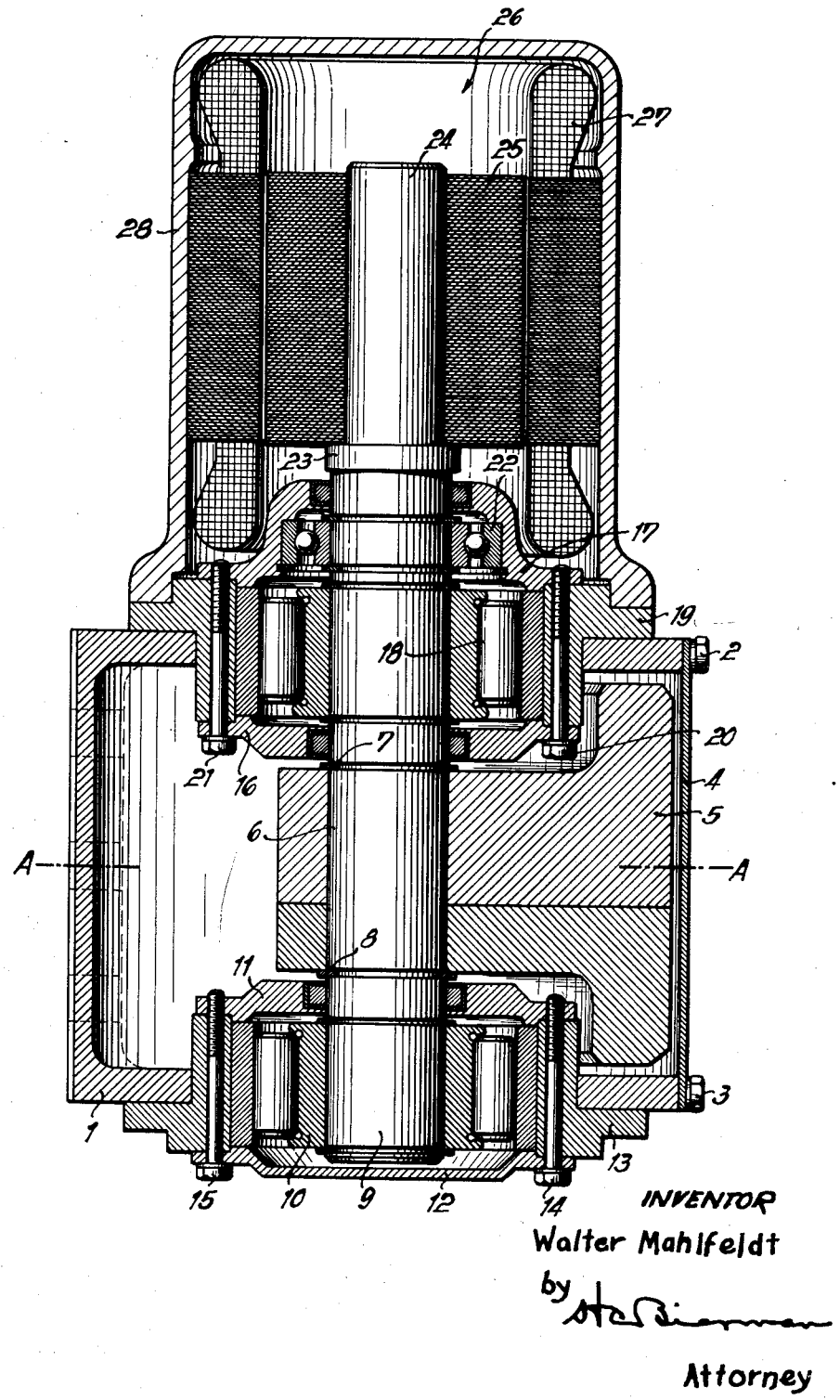
INVENTOR
Walter Mahlfeldt
by
Attorney United States Patent Office 2,972,688
Patented Feb. 21, 1961

2,972,688

UNBALANCED ROTOR DYNAMOELECTRIC MACHINE

Walter Mahlfeldt, 95 Bergstrasse, Hagen, Westphalia, Germany

Filed Dec. 21, 1956, Ser. No. 629,899

Claims priority, application Germany Dec. 23, 1955

4 Claims. (Cl. 310—81)

This invention relates to electric oscillators in which the fly-weight member is mounted on the shaft of the electric motor by which it is driven and is supported on both sides.

The development of electric oscillators has proceeded from the conventional construction of the electric motor, and the shaft has been arranged preferably so as to project from either side of the housing, while the fly-weights have been mounted on the projecting ends thereof with the aid of an additional mounting. In order to mount the fly-weights securely and fixedly in this construction, while ensuring that the electric motor is not damaged and that the fly-weights do not scrape the surrounding housing, at least four bearings are required when two fly-weights are to be driven by one and the same electric motor. Such oscillators can, if desired, be used in the vertical position if a thrust bearing is employed instead of a roller bearing. In the case of fly-weight oscillators in which the fly-weight axis is inclined with respect to the horizontal in a vertical plane, the lower fly-weight has been omitted and the shaft has been mounted in three bearings, two of which receive the rotor of the electric motor, or the fly-weight, between them. It will be apparent that this construction is extremely costly and difficult and that above all it involves considerable expenditure of time when the electrical part of the oscillator has to be replaced, which may be necessary at relatively frequent intervals inasmuch as windings in the stator may be scorched or burnt through due to overloading.

The invention provides an electric oscillator which is of substantially simpler and cheaper construction than the conventional arrangements and which in addition can very readily be dismantled when repairs become necessary.

The invention proceeds from electric oscillators in which the fly-weight member is mounted on the shaft of the electric motor by which it is driven and is supported on both sides, and proposes that the rotor of the electric motor be mounted in overhung fashion on that end of the shaft which projects freely from one of the fly-weight bearings. With this construction, it is possible to dispose the field winding of the electric motor on the inside of a hood mounted over the overhung end of the shaft. When damage occurs in the electrical part of the oscillator and must be limited to the field windings housed in the hood, this hood can be removed without difficulty, and if the repair is to take a relatively long time, the hood can simply be replaced by a comparatively cheap new hood or by the hood of another oscillator which is not in service at the time.

Since the bearings of the fly-weight member generally only have a play of a few hundredths of a millimeter at most, while the dimensions of the air gap are larger by a power of ten, the mounting according to the invention involves no difficulties and for the first time a construction is provided in which the mechanical and electrical parts are completely separate from one another.

The accompanying drawing illustrates a constructional example of the electric oscillator according to the invention.

In the drawing, the fly-weight 5 is mounted on the shaft 6 with the aid of the locating rings 7, 8 in the housing 1, which is closed by a cover 4 with the aid of the screws 2, 3. The end 9 of the shaft is mounted in a roller bearing 10 which is disposed in the bearing housing 11, 12. The two parts 11, 12 of the bearing housing are secured to the housing 1 through an intermediate member 13 with the aid of the screws 14, 15.

A second bearing housing consisting of the parts 16, 17 receives the roller bearing 18 and is secured to the other end of the housing 1 through the intermediate member 19 with the aid of the screws 20, 21. Also mounted in the housing consisting of the parts 16, 17 is a ball bearing 22, which serves as a thrust bearing. The shaft 6 is of increased diameter at its free end to provide a collar 23 beyond which it is reduced to the shaft end 24. Mounted on this end 24 of the shaft is the rotor 25 of the electric motor 26, the field winding 27 of which is disposed in a housing 28 which is suitably secured to the intermediate member 19. For the sake of clarity, the electrical connections for the field winding have not been illustrated in the drawing.

The principle of the invention can be extended by additionally mounting a rotor in overhung fashion on the other end 9 of the shaft symmetrically in relation to the fly-weight member 5 to increase the output of the fly-weight oscillator, and by also freely mounting the field winding over the said rotor, so that a symmetrical arrangement with respect to the line A—A is then obtained. In addition, the transmission of forces to the machine driven by the fly-weight oscillator can thereby be avoided.

It will be understood that the invention is not limited to the embodiment described in the foregoing and illustrated in the drawing, but that numerous modifications may be made therein without departing from the underlying idea of the invention.

I claim:

1. An electric oscillator comprising a casing having openings at the opposite ends thereof, a pair of bearings, housings enclosing said bearings, said housings having flanges, said bearings inserted in said openings with said flanges on the outer faces of said casing, a solid integral shaft held in said bearings, said shaft extending out of one end of said casing, said shaft extension being free, a flyweight secured to said shaft between said bearings, a rotor secured to said shaft extension, a motor housing having a stator fixed therein surrounding said stator and mounted on said casing, said motor housing being removable without removal of said shaft or the bearing adjacent said housing, the bearing at the other end of said shaft being removable without removal of any other element of said oscillator.

2. An electric oscillator comprising a casing having openings at the opposite ends thereof, a pair of bearings, housings enclosing said bearings, said housings having flanges, said bearings inserted in said openings with said flanges on the outer faces of said casing, a solid integral shaft held in said bearings, said shaft extending out of one end of said casing, said shaft extension being free, a flyweight secured to said shaft between said bearings, a rotor secured to said shaft extension, a motor housing having a stator fixed therein surrounding said stator and mounted on said casing, a thrust bearing for said shaft mounted on one of said bearing housings and secured to said shaft extension, said motor housing being removable without removal of said shaft or the bearing adjacent said housing, the bearing at the other end of said shaft being removable without removal of any other element of said oscillator.

3. An electric oscillator comprising a casing having openings at the opposite ends thereof, a pair of bearings, housings enclosing said bearings, said housings having flanges, said bearings inserted in said openings with said flanges on the outer faces of said casing, a solid integral shaft held in said bearings, said shaft extending out of one end of said casing, said shaft extension being free, a flyweight secured to said shaft between said bearings, a rotor secured to said shaft extension, a motor housing having a stator fixed therein surrounding said stator and mounted on said casing by an intermediate bearing housing, said motor housing being removable without removal of said shaft or the bearing adjacent said housing, the bearing at the other end of said shaft being removable without removal of any other element of said oscillator.

4. An electric oscillator comprising a casing having openings at the opposite ends thereof, a pair of bearings, housings enclosing said bearings, said housings having flanges, said bearings inserted in said openings with said flanges on the outer faces of said casing, a solid integral shaft held in said bearings, said shaft extending out of one end of said casing, said shaft extension being free, a flyweight secured to said shaft between said bearings, a rotor secured to said shaft extension, a motor housing having a stator fixed therein surrounding said stator and mounted on said casing, an opening in the side of said casing adjacent to said flyweight and a cover for said opening, said motor housing being removable without removal of said shaft or the bearing adjacent said housing, the bearing at the other end of said shaft being removable without removal of any other element of said oscillator.

References Cited in the file of this patent

UNITED STATES PATENTS

| | | |
|---|---|---|
| 868,362 | Priest | Oct. 15, 1907 |
| 1,299,965 | Leake | Apr. 18, 1919 |
| 2,022,699 | Von Henke | Dec. 3, 1935 |
| 2,116,708 | Niekamp | May 10, 1938 |
| 2,459,384 | Ljunggren | Jan. 18, 1949 |
| 2,463,843 | Wright | Mar. 8, 1949 |
| 2,504,748 | Steenstrup | Apr. 18, 1950 |
| 2,551,623 | More | May 8, 1951 |

FOREIGN PATENTS

| | | |
|---|---|---|
| 500,861 | Great Britain | Feb. 16, 1939 |